US008824804B2

(12) United States Patent
Tamatani et al.

(10) Patent No.: US 8,824,804 B2
(45) Date of Patent: Sep. 2, 2014

(54) IMAGE PROCESSING APPARATUS AND IMAGE PROCESSING METHOD

(75) Inventors: Mitsuyuki Tamatani, Kanagawa (JP); Kazuo Yamada, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 434 days.

(21) Appl. No.: 13/287,497

(22) Filed: Nov. 2, 2011

(65) Prior Publication Data

US 2012/0268629 A1    Oct. 25, 2012

(30) Foreign Application Priority Data

Apr. 25, 2011  (JP) ................................. 2011-097107

(51) Int. Cl.
*G06K 9/66*   (2006.01)
*G06T 1/20*   (2006.01)

(52) U.S. Cl.
CPC ....................................... *G06T 1/20* (2013.01)
USPC .......................................... 382/194; 382/245

(58) Field of Classification Search
None
See application file for complete search history.

(56) References Cited

U.S. PATENT DOCUMENTS

| 4,599,656 | A  | * | 7/1986  | Bellinghausen ............... 382/237 |
| 4,785,356 | A  | * | 11/1988 | Gonzales et al. ............. 382/238 |
| 6,240,203 | B1 | * | 5/2001  | Kawano et al. ............... 382/164 |
| 6,373,981 | B1 | * | 4/2002  | de Queiroz et al. ........... 382/176 |
| 2002/0145743 | A1 | * | 10/2002 | Lopez et al. .................... 358/1.4 |
| 2005/0074186 | A1 | * | 4/2005  | Lu et al. ......................... 382/299 |
| 2006/0176520 | A1 | * | 8/2006  | Motomura et al. ........... 358/451 |
| 2006/0233460 | A1 | * | 10/2006 | Kondo et al. ................. 382/276 |
| 2007/0036462 | A1 | * | 2/2007  | Crandall et al. .............. 382/284 |
| 2009/0219444 | A1 |   | 9/2009  | Notsu et al. |
| 2010/0030748 | A1 | * | 2/2010  | Netz et al. ......................... 707/3 |

FOREIGN PATENT DOCUMENTS

JP     A-05-143720    6/1993
JP     A-2008-040614  2/2008

* cited by examiner

*Primary Examiner* — Jingge Wu
(74) *Attorney, Agent, or Firm* — Oliff PLC

(57) ABSTRACT

An image processing apparatus includes: a determining unit determining, in image data including packs each including pixels and serving as a unit, a monotonic pack including pixels equal to a precedently image-processed preceding pixel and a normal pack other than the monotonic pack; a pixel row forming unit forming a pixel row including aligned pixels of the normal pack, while deleting the pixels of the monotonic pack; a pixel row processing unit processing the formed pixel row by inputting the pixel row to an image processing unit; and a supplementing unit supplementing an image processing result of the pixel row output from the image processing unit with, as an image processing result of the deleted pixels of the monotonic pack, a result of image processing by the image processing unit on the preceding pixel of the normal pack, to thereby obtain an image processing result of the image data.

3 Claims, 10 Drawing Sheets

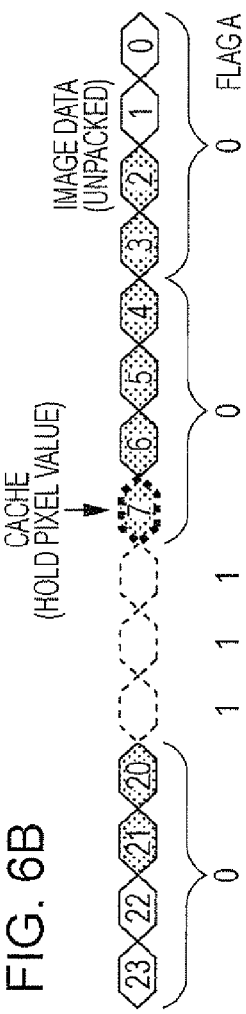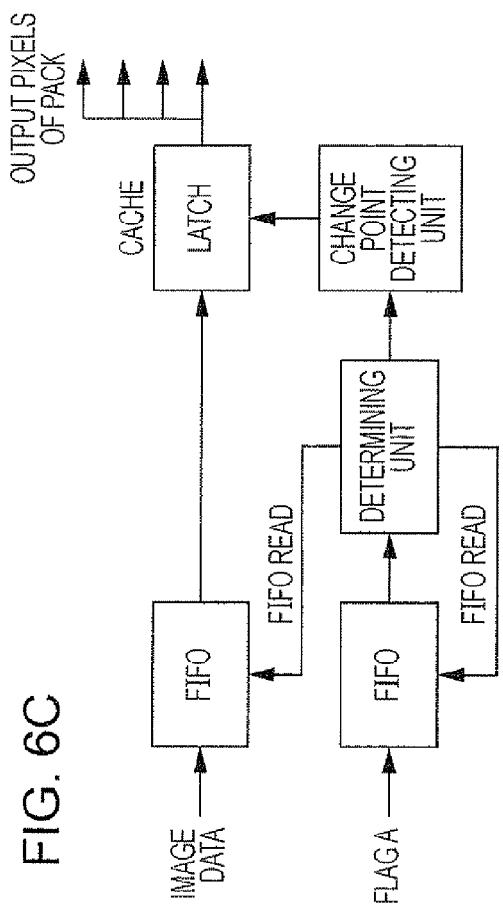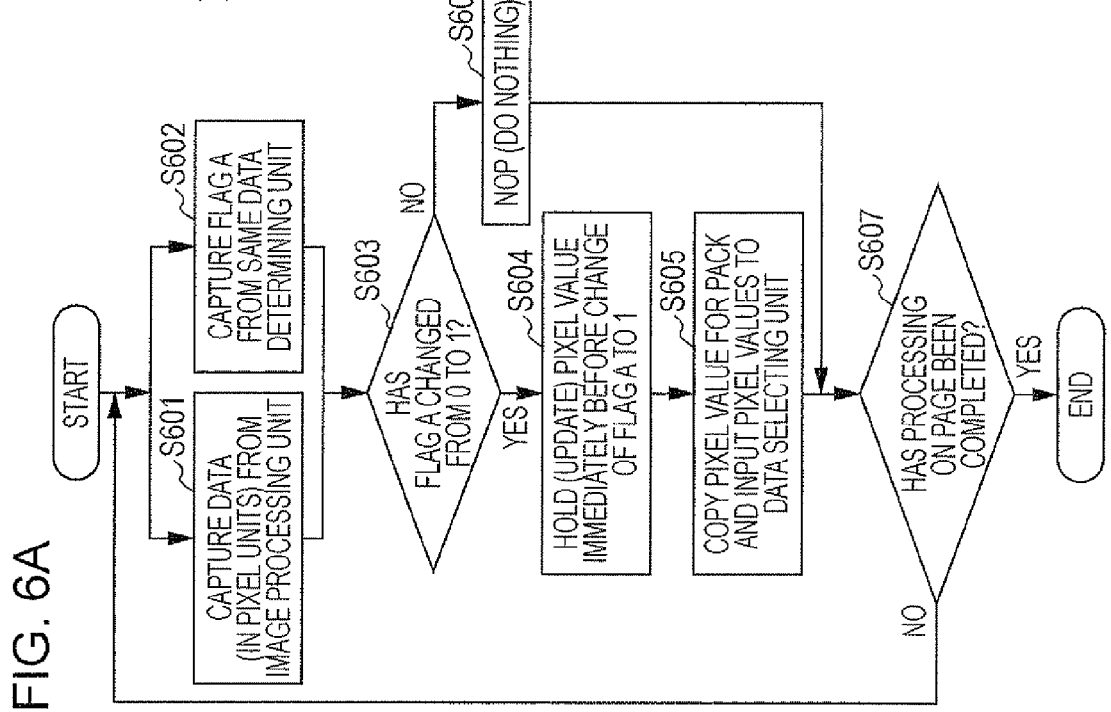

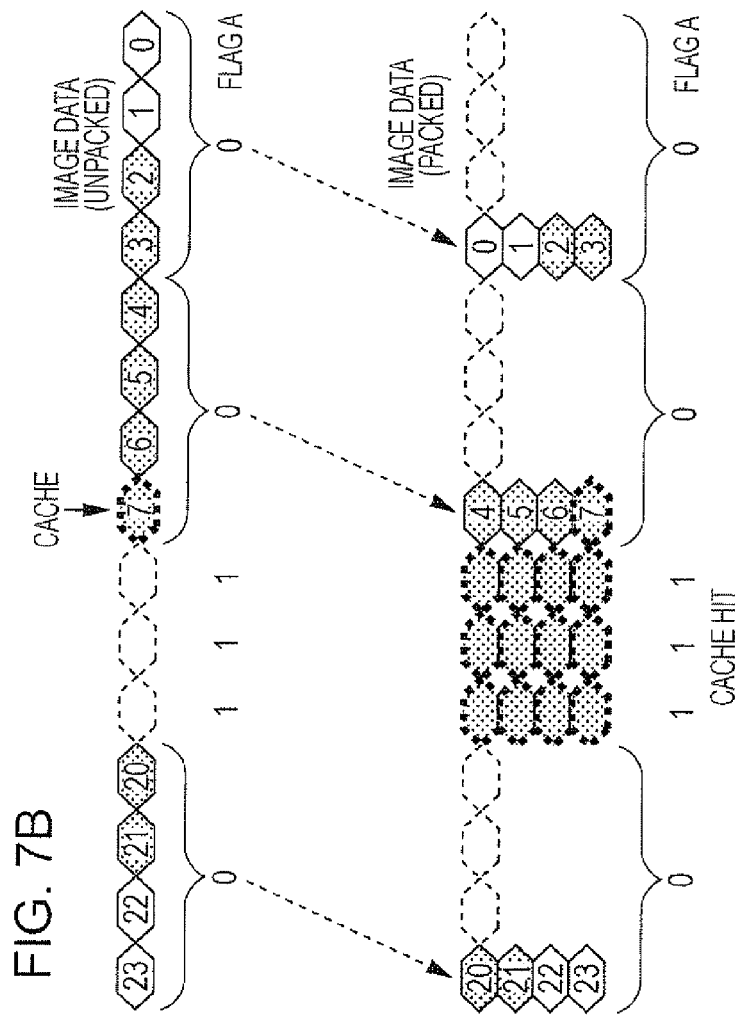
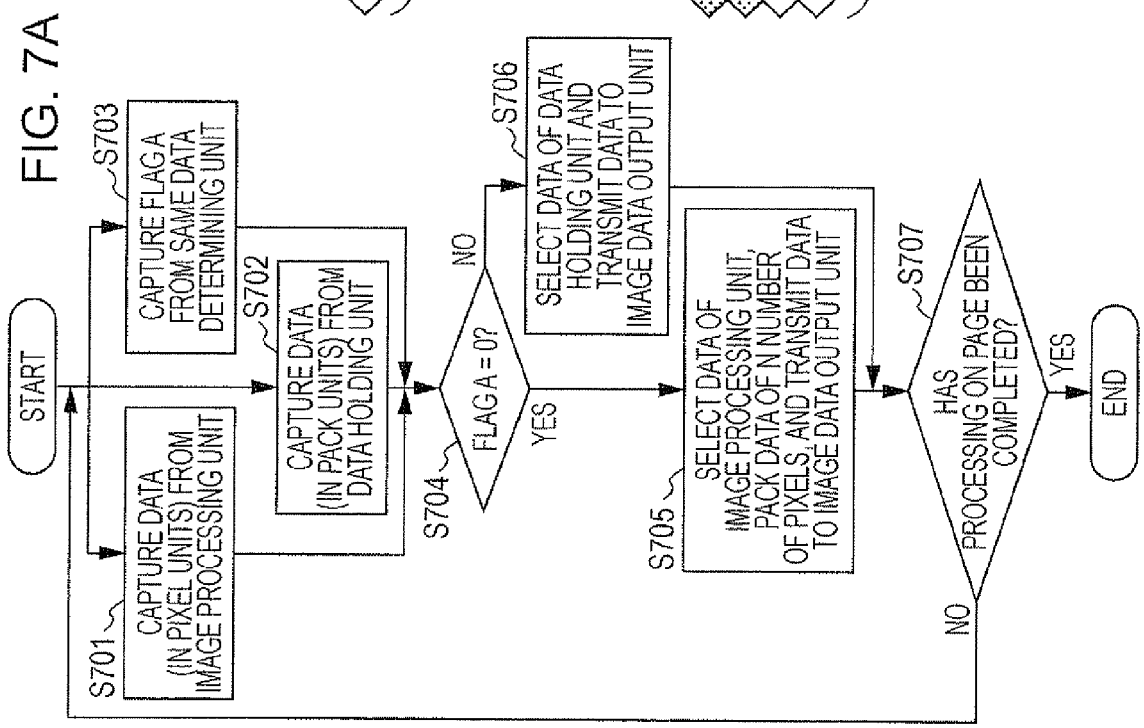
FIG. 7A
FIG. 7B

FIG. 10A
FIG. 10B
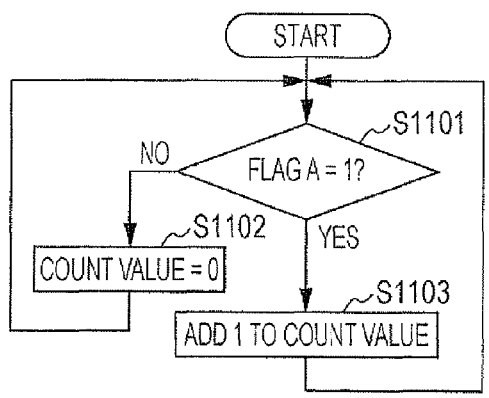
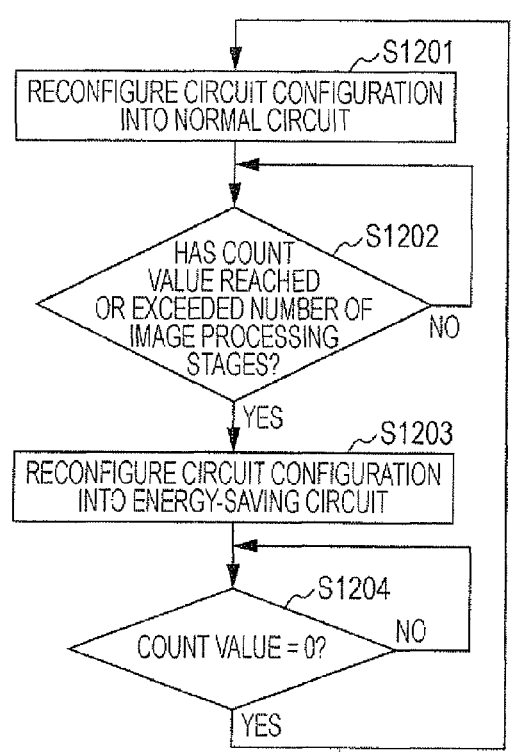

IMAGE PROCESSING APPARATUS AND IMAGE PROCESSING METHOD

CROSS-REFERENCE TO RELATED APPLICATIONS

This application is based on and claims priority under 35 USC 119 from Japanese Patent Application No. 2011-097107 filed Apr. 25, 2011.

BACKGROUND (i) Technical Field

The present invention relates to an image processing apparatus and an image processing method.

(ii) Related Art

A technique of performing image processing, such as a color conversion process and a filtering process, on image data has been known, and some techniques of increasing the speed of the image processing have been proposed in the past.

SUMMARY

According to an aspect of the invention, there is provided an image processing apparatus including a determining unit, a pixel row forming unit, a pixel row processing unit, and a supplementing unit. The determining unit determines, in image data formed by plural packs each formed by plural pixels and serving as a unit, a monotonic pack formed by plural pixels equal to a preceding pixel precedently subjected to image processing and a normal pack other than the monotonic pack. The pixel row forming unit forms a pixel row including plural pixels obtained from the normal pack and arranged in a line, while deleting the plural pixels included in the monotonic pack. The pixel row processing unit processes the pixel row formed by the pixel row forming unit, by inputting the pixel row to an image processing unit. The supplementing unit supplements an image processing result of the pixel row output from the image processing unit with, as an image processing result of the deleted pixels of the monotonic pack, a result of image processing by the image processing unit on the preceding pixel obtained from the normal pack, to thereby obtain an image processing result of the image data.

BRIEF DESCRIPTION OF THE DRAWINGS

Exemplary embodiments of the present invention will be described in detail based on the following figures, wherein:

FIGS. 6A to 6C are diagrams illustrating processing of a data holding unit;

FIGS. 7A and 7B are diagrams illustrating processing of a data selecting unit;

FIGS. 10A and 10B are diagrams illustrating reconfiguration processing of the modified example.

DETAILED DESCRIPTION

Exemplary embodiments of the invention will be described below.

Figure 1:
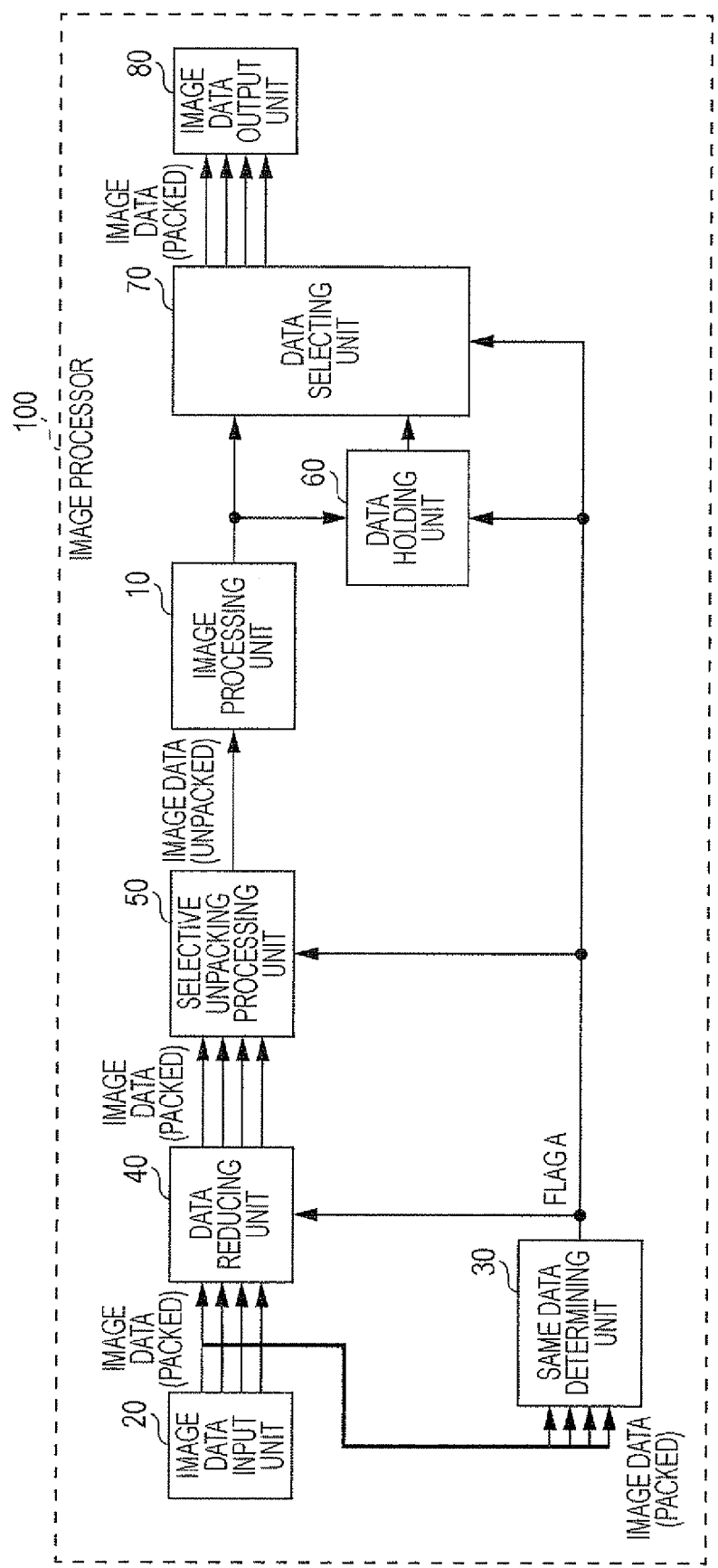
FIG. 1 is a diagram illustrating an image processing apparatus of an exemplary embodiment of the invention.

FIG. 1 is a diagram illustrating an image processing apparatus of an exemplary embodiment of the invention. The image processing apparatus of FIG. 1 performs image processing on image data, and obtains the image data subjected to the image processing. The image data to be subjected to the image processing is provided from an external device, such as a computer, for example. The image processing apparatus may, of course, have a not-illustrated image reading function (scanning function) and perform image processing on image data obtained from a medium, such as paper, through the function. Further, the image processing apparatus may have a not-illustrated print function and output an image corresponding to the processed image data by printing the image on paper or the like, or may provide the processed image data to an external device.

FIG. 1 illustrates an image processor 100 included in the image processing apparatus. The image processor 100, which is realized by a dynamic reconfigurable processor (DRP), for example, performs image processing on image data, and outputs the image data subjected to the image processing. The image processor 100 may, of course, be realized by a programmable logic device (PLD) or a field programmable gate array (FPGA), for example, or may be realized by an application specific integrated circuit (ASIC). The above-described hardware for realizing the image processor 100 is merely an example, and the image processor 100 may be realized by other hardware. Units of the image processor 100 will be described in detail below.

The image data to be processed by the image processor 100 is input to an image data input unit 20. An example of the image data is bitmap data. The image data, however, is not limited thereto. The image data input to the image data input unit 20 is formed by plural pixels (pixel data). The image data input unit 20 packs the plural pixels included in the image data into packs each formed by some pixels, and outputs the thus obtained plural packs to subsequent units.

Figure 2:
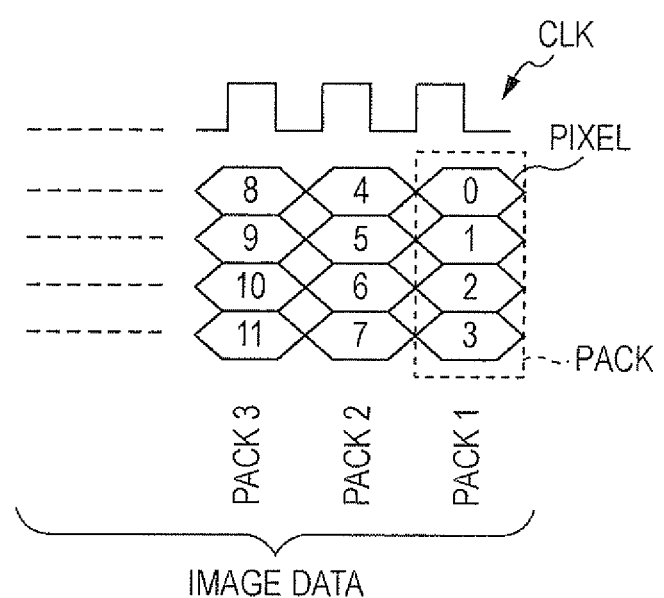
FIG. 2 is a diagram illustrating a specific example of image data output from an image data input unit.

FIG. 2 is a diagram illustrating a specific example of the image data output from the image data input unit 20. The image data includes plural pixels (pixel data). In FIG. 2, the respective pixels are sequentially assigned with numbers from zero. For example, the respective pixels are assigned with numbers in the order of raster scanning in which scanning proceeding from the left end to the right is performed downward from the upper end in a stepwise manner in a page of an image. A pixel 11 may, of course, be followed by multiple pixels.

The image data input unit 20 outputs the image data in packs each formed by some pixels. In the example illustrated in FIG. 2, four pixels form one pack. That is, pixels 0 to 3 form a pack 1, pixels 4 to 7 form a pack 2, and pixels 8 to 11 form a pack 3. The number of pixels forming one pack is not limited to four. One pack may be formed by another number of pixels, such as eight pixels, for example.

The image data formed by the plural packs is transmitted in packs to the stages subsequent to the image data input unit 20. For example, one pack is transmitted in each clock (CLK) cycle to a same data determining unit 30 from the image data input unit 20 of FIG. 1.

Figures 3A, 3B:
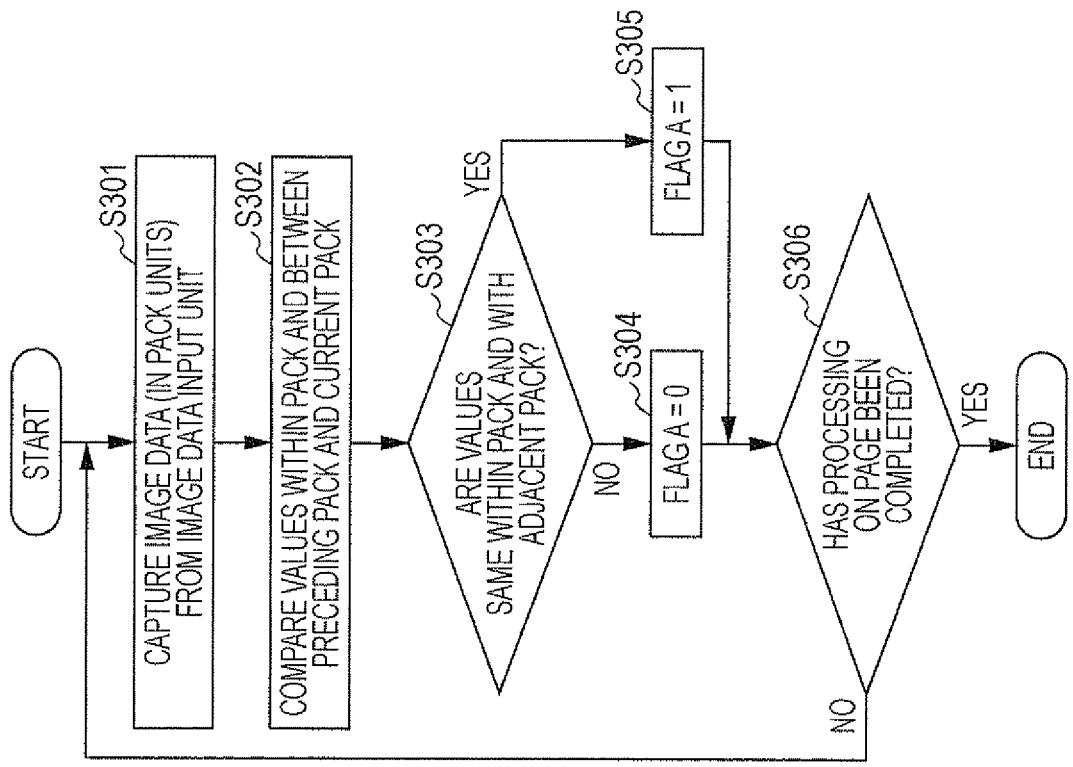
FIGS. 3A and 3B are diagrams illustrating processing of a same data determining unit.

FIG. 3A is a diagram illustrating processing of the same data determining unit 30. The same data determining unit 30 captures the image data from the image data input unit 20 (Step S301). The image data is captured in packs. The same data determining unit 30 compares, for each of the captured packs, pixel values of all pixels included in the current pack with pixel values of all pixels included in a pack captured immediately before the current pack (preceding pack) (Step S302). Then, the same data determining unit 30 determines whether or not a condition that all of the pixel values in the current pack are the same and are the same as all of the pixel values in the preceding pack is satisfied (Step S303).

Then, if the condition of Step S303 is not satisfied, a flag A of the current pack is set to 0 (Step S304). If the condition of Step S303 is satisfied, the flag A of the current pack is set to 1 (Step S305). The processing of the above-described Steps S301 to S305 is repeated until the processing on all of the packs in a page is completed (Step S306).

FIG. 33 illustrates an example of determination performed by the above-described processing. In the determination example, the packs are sequentially captured in succession from the pack 1 at the initial position. Further, in the determination example, pixels 2 to 21 have the same pixel value, which is different from pixel values of the other pixels. The pack 1 at the initial position is not preceded by the preceding pack, and thus the flag A is set to 0. As for the pack 2, all of the pixel values therein are the same, but are different from the pixel values of the pixels 0 and 1 in the pack 1 serving as the preceding pack. Therefore, the flag A is set to 0. As for the pack 3, all of the pixel values therein are the same, and are the same as all of the pixel values in the pack 2 serving as the preceding pack. Therefore, the flag A is set to 1. Similarly, the flag A is set to 1 for packs 4 and 5. Further, a pack 6 does not satisfy the condition that all of the pixel values in a pack are the same. Therefore, the flag A is set to 0.

The state in which the pixel values are the same desirably includes a case where the pixel values completely match, but may include a case where the pixel values are approximate enough to be regarded as the same. For example, if the difference between two pixel values is equal to or smaller than a reference value for determination, the two pixel values may be determined as the same.

The image data output in packs from the image data input unit 20 is also transmitted to a data reducing unit 40. Referring to the flag A obtained from the same data determining unit 30, the data reducing unit 40 performs deletion processing described in detail below.

Figure 4A:
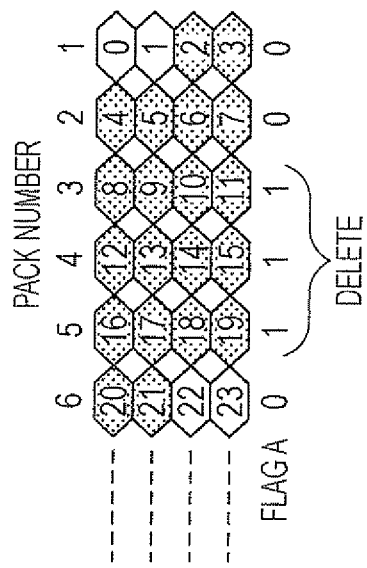
FIGS. 4A and 4B are diagrams illustrating processing of a data reducing unit.

FIG. 4A is a diagram illustrating processing of the data reducing unit 40. The data reducing unit 40 captures the image data in pack units from the image data input unit 20, and captures from the same data determining unit 30 the flags A corresponding to the respective packs (Step S401). Then, the data reducing unit 40 checks, for each of the packs, the flag A corresponding to the pack (Step S402).

In the checking, if the flag A is set to 0, the image data (plural pixel data items) included in the pack is directly output to a subsequent processing unit (Step S403). Meanwhile, if the flag A is set to 1, the image data included in the pack is deleted (Step S404). The processing of the above-described Steps S401 to S404 is repeated until the processing on all of the packs in a page is completed (Step S405).

Figure 4B:
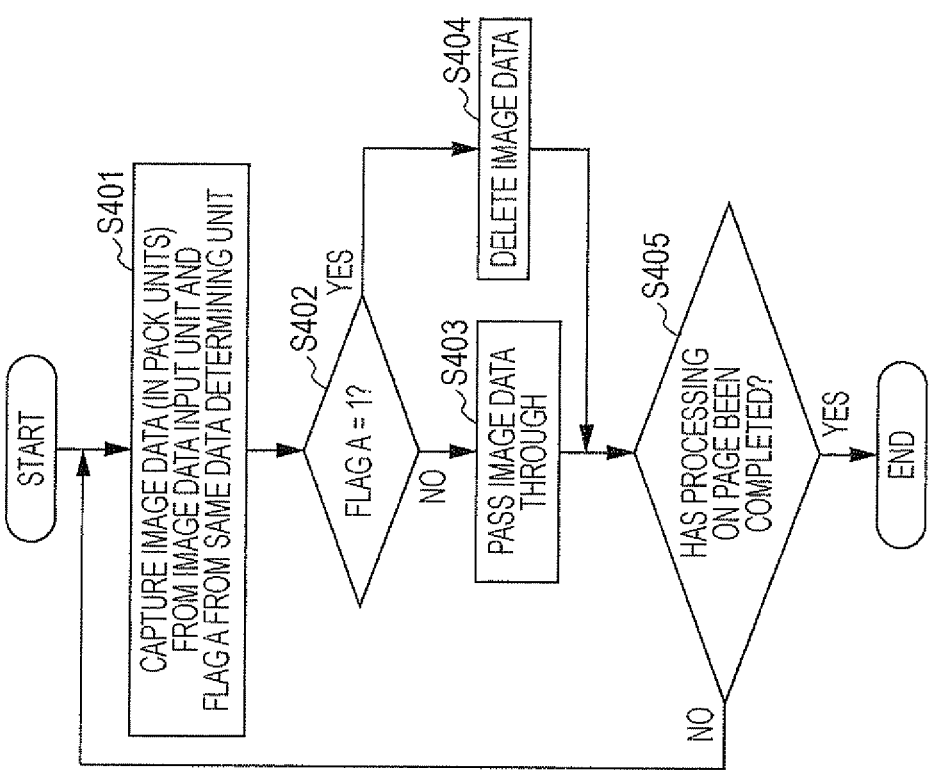

FIG. 4B illustrates an example of deletion performed by the above-described processing. In the deletion example, the packs are sequentially captured in succession from the pack 1 at the initial position. Further, in the deletion example, the flag A is set to 0 for the packs 1, 2, and 6, and is set to 1 for the packs 3, 4, and 5. Therefore, the image data of the packs 1, 2, and 6 is output to the subsequent processing unit, and the image data of the packs 3, 4, and 5 is deleted.

The image data output from the data reducing unit 40 is transmitted to a selective unpacking processing unit 50. Referring to the flag A obtained from the same data determining unit 30, the selective unpacking processing unit 50 performs unpacking processing described in detail below.

Figure 5A:
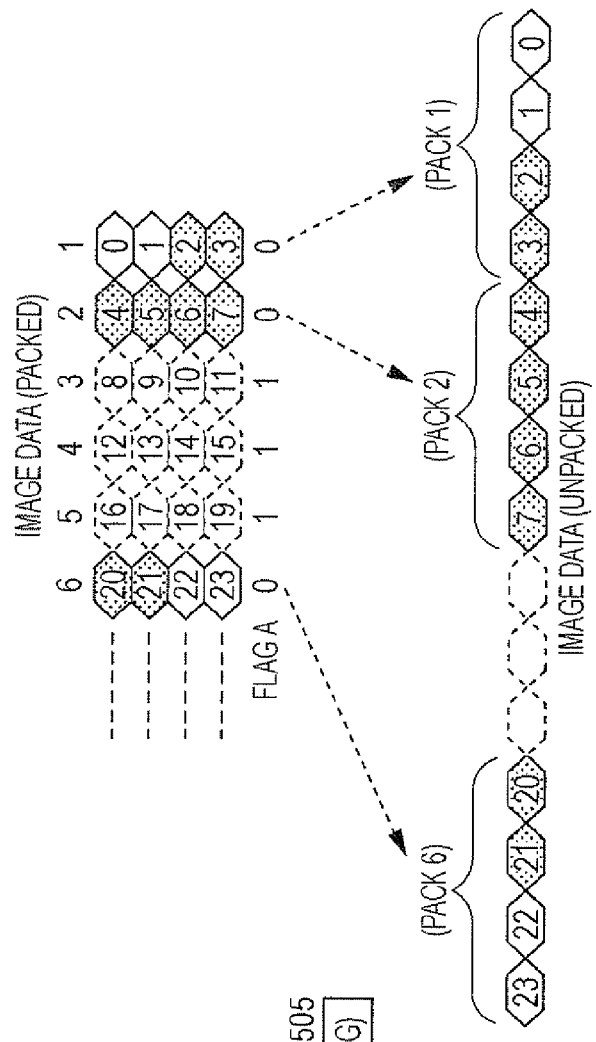
FIGS. 5A and 5B are diagrams illustrating processing of a selective unpacking processing unit.

FIG. 5A is a diagram illustrating processing of the selective unpacking processing unit 50. The selective unpacking processing unit 50 captures the image data output in pack units from the data reducing unit 40 (Step S501), and captures from the same data determining unit 30 the flags A corresponding to the respective packs (Step S502). Then, the selective unpacking processing unit 50 checks, for each of the packs, the flag A corresponding to the pack (Step S503).

In the checking, if the flag A is set to 0, the image data (plural pixel data items) included in the pack is subjected to the unpacking processing (processing of unpacking the pack), and is output to a subsequent processing unit (Step S504). Meanwhile, if the flag A is set to 1, no processing is performed on the pack (Step S505). The processing of the above-described Steps S501 to S505 is repeated until the processing on all of the packs in a page is completed (Step S506).

Figure 5B:
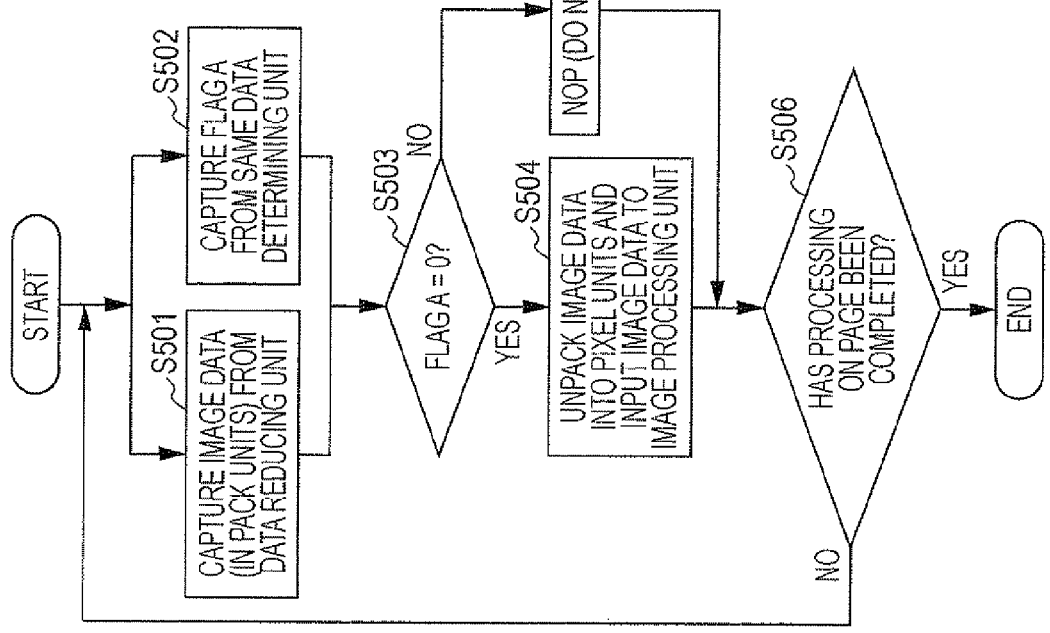

FIG. 5B illustrates an example of selective unpacking processing performed by the above-described processing. In the processing example, the flag A is set to 0 for the packs 1, 2, and 6. Thus, the image data included in these packs has not been deleted in the data reducing unit 40, and is obtained from the data reducing unit 40. Meanwhile, the flag A is set to 1 for the packs 3, 4, and 5. Thus, the image data included in these packs has been deleted in the data reducing unit 40.

As for the pack 1, the flag A is set to 0. Therefore, the pixels 0 to 3 included in the pack 1 are subjected to the unpacking processing, and are arranged in a line in the order of the pixels 0, 1, 2, and 3. As for the pack 2, the flag A is similarly set to 0. Therefore, the pixels 4 to 7 included in the pack 2 are subjected to the unpacking processing, and are arranged in a line after the pixel 3 in the order of the pixels 4, 5, 6, and 7.

Meanwhile, the flag A is set to 1 for the pack 3. Therefore, no processing is performed on the pack 3, and the data corresponding to the timing of the pack 3 (one clock) is made blank (null, for example). As for the packs 4 and 5, the flag A is also set to 1. Therefore, no processing is performed on the packs 4 and 5. Thereby, the data for three clocks corresponding to the packs 3 to 5 is made blank. Further, as for the pack 6 subsequent thereto, the flag A is set to 0. Therefore, pixels 20 to 23 included in the pack 6 are subjected to the unpacking processing, and are arranged in a line in the order of the pixels 20, 21, 22, and 23 after the data blank period corresponding to three clocks (null data for three clocks, for example).

The image data output from the selective unpacking processing unit 50 of FIG. 1, i.e., a pixel row formed by the plural pixel data items selectively subjected to the unpacking processing and arranged in a line is transmitted to an image processing unit 10. The image processing unit 10 performs image processing on the pixel row. For example, the image processing unit 10 performs image processing, such as a color conversion process and a filtering process, on each of the pixels included in the pixel row. The image processing of the image processing unit 10 is not limited to these processes. For example, other publicly known image processing may be performed.

The pixel row subjected to the image processing by the image processing unit 10 is transmitted to a data holding unit 60. Referring to the flag A obtained from the same data determining unit 30, the data holding unit 60 performs data holding processing described in detail below.

FIG. 6A is a diagram illustrating processing of the data holding unit 60. The data holding unit 60 captures the image data (row of pixel data items) subjected to the image processing, which is output in pixel units from the image processing unit 10 (Step S601), and captures from the same data determining unit 30 the flag A corresponding to the pack including the pixels (Step S602). Then, the data holding unit 60 checks the successively captured flags A (Step S603).

In the checking, if the flag A has changed from 0 to 1, the pixel value of the pixel immediately before the change of the flag A to 1 is held (Step S604). Further, the held pixel value is copied for the number of pixels forming a pack, and thereby pixels for one pack are formed. The pixels are then output to a subsequent processing unit (Step S605). Meanwhile, if the flag A does not change from 0 to 1, no processing is performed (Step S606). The processing of the above-described Steps S601 to S606 is repeated until the processing on all of the packs in a page is completed (Step S607).

FIG. 6B illustrates an example of holding of the pixel value performed by the above-described processing. In the processing example, the image data is the pixel row formed by the plural pixels subjected to the image processing. The pixels 0 to 3 are the pixels obtained from the pack 1 (see FIG. 5B), and thus are associated with the flag A of the pack 1 set to 0. Further, the pixels 4 to 7 are the pixels obtained from the pack 2 (see FIG. 5B), and thus are associated with the flag A of the pack 2 set to 0. Three data blank spaces following the pixel 7 are the deleted portions corresponding to the packs 3, 4, and 5, and thus are associated with the flag A of the packs 3, 4, and 5 set to 1. In the holding example, therefore, the flag A changes from 0 to 1 at the time of a change from the pixel 7 to the next data blank space. Thus, the pixel value of the pixel 7 immediately before the change of the flag A to 1 is held (cached).

Further, FIG. 6C illustrates a circuit configuration example of the data holding unit 60. The image data obtained from the image processing unit 10 and the flag A obtained from the same data determining unit 30 are captured by first-in first-out (FIFO) memories corresponding thereto, respectively. A determining unit successively reads the flags A from the corresponding FIFO memory, and determines whether each of the flags A is 0 or 1. Further, in accordance with the timing of reading the flag A from the FIFO memory, the determining unit outputs the pixel data corresponding to the flag A from the corresponding FIFO memory to a latch. Then, if a change point detecting unit detects the time of the change of the flag A from 0 to 1, the pixel value of the pixel immediately before the change of the flag A to 1 is held (cached) by the latch. Further, the held pixel value is copied for the number of pixels forming a pack. For example, the pixel value is copied for four pixels in the example of FIG. 6B. Thereby, the pixels for one pack are formed, and are output to a subsequent processing unit.

Referring to the flag A obtained from the same data determining unit 30, a data selecting unit 7 of FIG. 1 forms plural packs including the pixels subjected to the image processing, by using the image data obtained from the image processing unit 10 and the data obtained from the data holding unit 60.

FIG. 7A is a diagram illustrating processing of the data selecting unit 70. The data selecting unit 70 captures the image data (row of pixel data items) subjected to the image processing, which is output in pixel units from the image processing unit 10 (Step S701), and captures the pixel data of one pack output from the data holding unit 60 (Step S702). The data selecting unit 70 further captures from the same data determining unit 30 the flag A corresponding to the pack including the pixels (Step S703). Then, the data selecting unit 70 checks the successively captured flags A (Step S704).

In the checking, if the flag A is set to 0, the image data obtained from the image processing unit 10 is selected, and the data of the N number of pixels is packed as one pack and output to a subsequent processing unit (Step S705). Herein, N represents the number of pixels forming each pack prior to the unpacking processing. Meanwhile, if the flag A is set to 1, the pixel data items of one pack obtained from the data holding unit 60 are selected, packed as one pack, and output to the subsequent processing unit (Step S706). The processing of the above-described Steps S701 to S706 is repeated until the processing on all of the packs in a page is completed (Step S707).

FIG. 7B illustrates an example of formation of packs performed by the above-described processing. In the formation example, the unpacked image data is the pixel row formed by the plural pixels and captured from the image processing unit 10. The pixels 0 to 3 are the pixels obtained from the pack 1 (see FIG. 5B), and thus are associated with the flag A of the pack 1 set to 0. Further, the pixels 4 to 7 are the pixels obtained from the pack 2 (see FIG. 5B), and thus are associated with the flag A of the pack 2 set to 0. Three data blank spaces following the pixel 7 are the deleted portions corresponding to the packs 3, 4, and 5, and thus are associated with the flag A of the packs 3, 4, and 5 set to 1.

In the formation example, therefore, if four pixels (N=4) of the pixels 0 to 3 corresponding to the flag A set to 0 are captured, the four pixels form one pack. Further, if four pixels of the pixels 4 to 7 corresponding to the flag A set to 0 are captured, the four pixels form the next one pack. Further, three data blank spaces following the pixel 7 are associated with the flag A set to 1. Therefore, the data of the pixel 7 held (cached) by the data holding unit 60 is copied for one pack, and the copied data forms one pack. This data is formed for three packs. That is, the image processing result of the deleted pixels is supplemented with the data of the pixel 7 subjected to the image processing. The pixels 20 to 23 subsequent thereto correspond to the flag A set to 0. Therefore, these four pixels form one pack.

The image data packed in the data selecting unit 70 of FIG. 1 is transmitted to an image data output unit 80, and is provided to the outside of the image processor 100 from the image data output unit 80.

As described above, according to the image processing apparatus including the image processor 100 of FIG. 1, the selective unpacking processing unit 50 does not perform the unpacking processing on the pack corresponding to the flag A set to 1, and selectively performs the unpacking processing on the pack corresponding to the flag A set to 0. As compared with a case where the unpacking processing is performed on all of the packs, therefore, the image data (row of pixel data items) obtained after the unpacking processing is reduced in length, and the image processing on the image data is increased in speed.

Further, as for the pixels included in the pack corresponding to the flag A set to 1, which have not been subjected to the unpacking processing, the data of the pixels subjected to the image processing is supplemented with the pixel value held by the data holding unit 60, and thereby the pack subjected to the image processing is formed. For example, in the example of formation of packs illustrated in FIG. 7B, the data of the pixel 7 subjected to the image processing is held and copied for three packs corresponding to the flag A set to 1. Prior to the image processing, the pixels 8 to 19 of the three packs corresponding to the flag A set to 1 have the same pixel value as the pixel value of the pixel 7. Therefore, the pixel value of the pixel 7 subjected to the image processing is regarded as the pixel value of the pixels 8 to 19 subjected to the image processing. Thereby, the same image processing result as the result of image processing performed on the pixels 8 to 19 is obtained.

Figure 8:
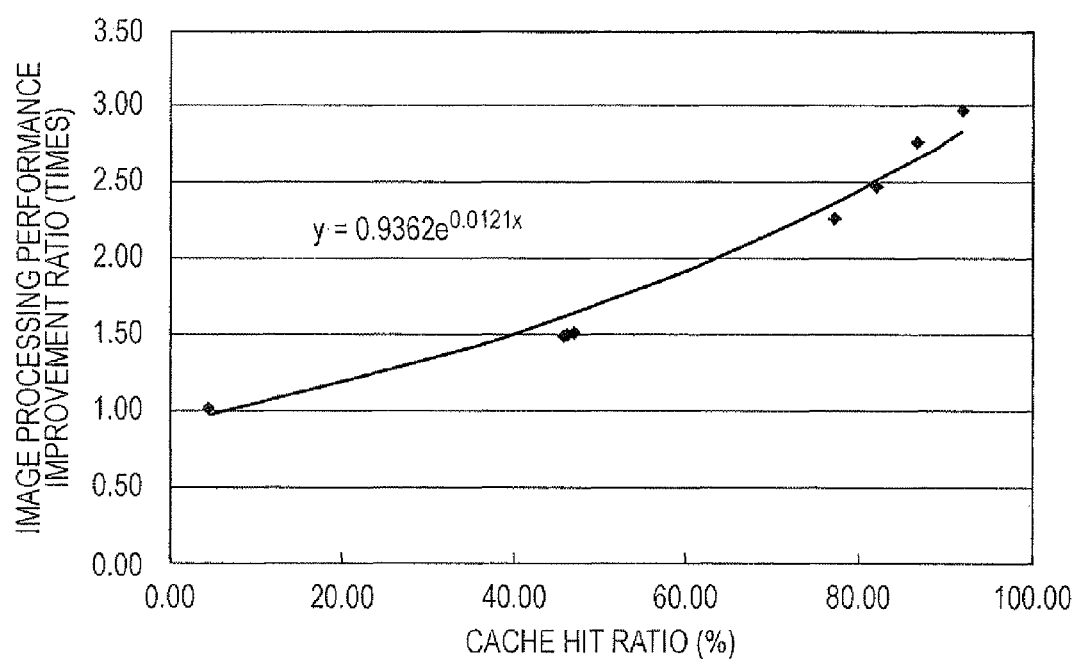
FIG. 8 is a diagram for explaining image processing performance of the present exemplary embodiment.

FIG. 8 is a diagram for explaining image processing performance of the present exemplary embodiment. FIG. 8 illustrates a graph relating to the image processing performance of the image processing apparatus of FIG. 1. A cache hit ratio represented by the horizontal axis of FIG. 8 represents the ratio of cache-hit packs (corresponding to the flag A set to 1) to all of the packs forming the image data.

Further, the vertical axis of FIG. 8 represents an image processing performance improvement ratio=PIX/(PACK× M+H×R). Herein, PIX represents the image size (the number of all pixels in the image data), PACK represents the number of the pixels in one pack, M represents the number of cache misses (the total number of packs corresponding to the flag A set to 0), H represents the number of cache hits (the number by which data is held by the data holding unit 60), and R represents the run-length value of the cache hit (the number by which the flag A set to 1 consecutively appears after one cache).

As illustrated in FIG. 8, if the cache hit ratio is about 50%, for example, the image processing performance improvement ratio is slightly over about 1.5 times. That is, according to the image processing apparatus including the image processor 100 of FIG. 1, the image processing performance is improved without additional provision of the image processing unit 10. According to the image processing apparatus of FIG. 1, therefore, the power consumption in the image processor 100 is reduced, as compared with, for example, a case where the plural image processing units 10 are provided in parallel in the image processor 100. Further, if the image processing apparatus is modified into a modified example described below, the power consumption in the image processor 100 is further reduced.

Figure 9:
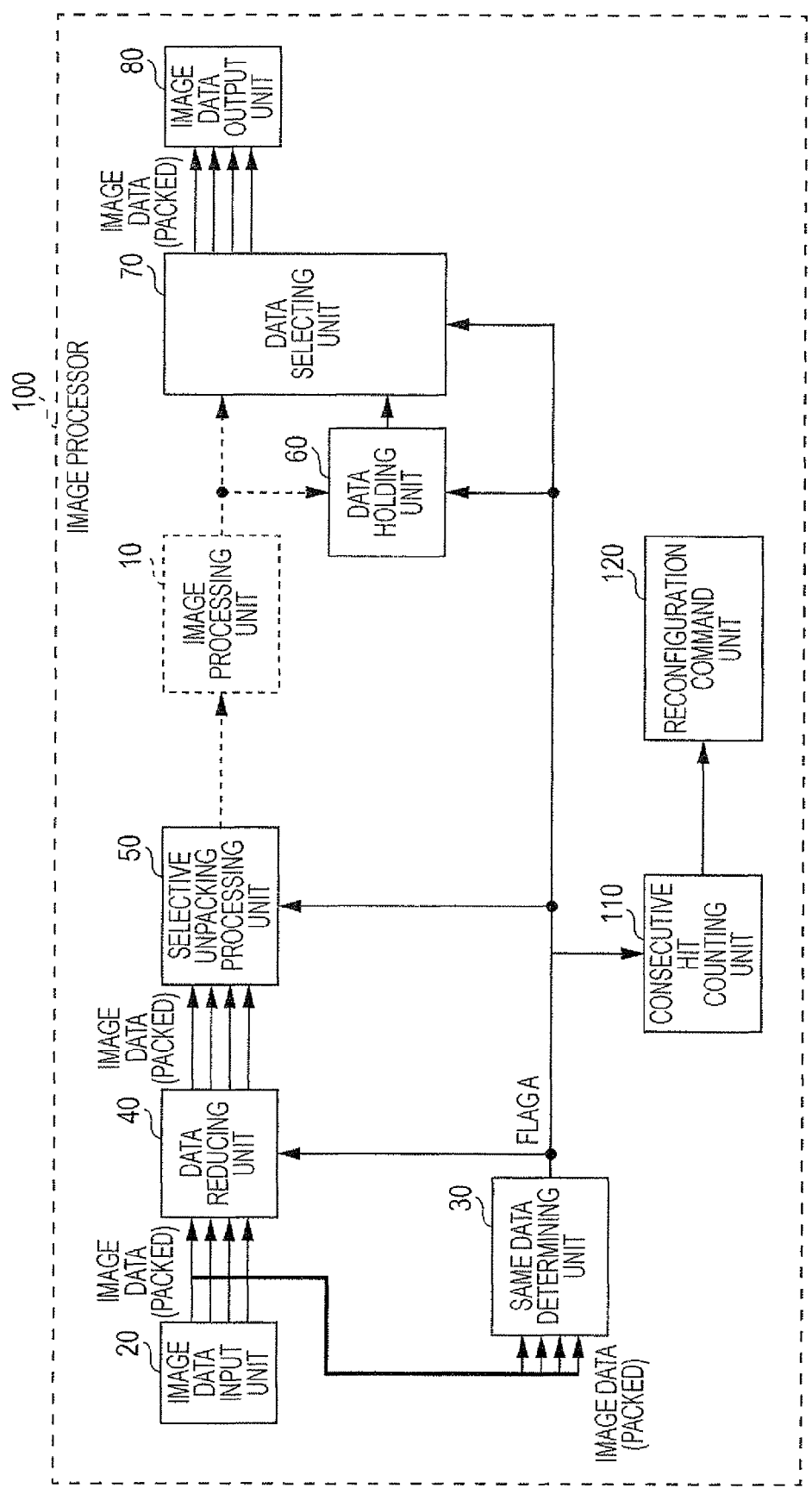
FIG. 9 is a diagram illustrating a modified example of the image processing apparatus of the exemplary embodiment of the invention.

FIG. 9 is a diagram illustrating a modified example of the image processing apparatus of the exemplary embodiment of the invention. FIG. 9 illustrates the image processor 100 included in the image processing apparatus. The image processor 100 of the modified example is realized by a reconfigurable circuit, such as a dynamic reconfigurable processor (DRP), for example.

The modified example illustrated in FIG. 9 is the same in configuration and operation as the image processing apparatus of FIG. 1, except for a consecutive hit counting unit 110 and a reconfiguration command unit 120. That is, the processing described in detail with reference to FIGS. 2 to 7B is also executed in the modified example illustrated in FIG. 9. In the execution process, the consecutive hit counting unit 110 and the reconfiguration command unit 120 of FIG. 9 execute reconfiguration processing on the reconfigurable circuit of the image processor 100.

FIGS. 10A and 10B are diagrams illustrating the reconfiguration processing of the modified example. FIG. 10A illustrates processing of the consecutive hit counting unit 110, and FIG. 10B illustrates processing of the reconfiguration command unit 120.

The consecutive hit counting unit 110 checks the flags A successively output for the respective packs from the same data determining unit 30 (Step S1101), and sets a count value to 0 if the flag A is set to 0 (Step S1102). As for the initial pack of the image data, the flag A is set to 0 (see FIG. 3B). Therefore, the count value is initialized to 0 at the initial position of the image data. Then, the consecutive hit counting unit 110 checks the successively output flags A (Step S1101), and adds 1 to the count value if the flag A is set to 1 (Step S1103).

In the initial state, the reconfiguration command unit 120 first sets the circuit configuration of the reconfigurable circuit of the image processor 100 to a normal circuit (Step S1201). Thereby, the image processor 100 including the image processing unit 10 (FIG. 9) is formed.

Then, the reconfiguration command unit 120 continues to check the count value of the consecutive hit counting unit 110 (Step S1202). If the count value has reached or exceeded the number of steps of image processing in the image processing unit 10, the reconfiguration command unit 120 reconfigures the circuit configuration of the reconfigurable circuit of the image processor 100 into an energy-saving circuit (Step S1203). Thereby, the image processor 100 not including the image processing unit 10 (FIG. 9) is formed.

The image processing unit 10 of FIG. 9 performs image processing on the pixels included in the pixel row selectively subjected to the unpacking processing. The image processing may be performed over plural stages. For example, the image processing of the pixels may be performed in a stepwise manner over plural stages (plural clocks) on the unpacked image data obtained in the unpacking processing example illustrated in FIG. 5B. In this case, the pixel 7 in the example of FIG. 5B is subjected to the image processing in a stepwise manner, and the pixel 7 subjected to the image processing is obtained after the plural clocks corresponding to the number of the stages. Therefore, if the count value reaches or exceeds a reference number, which is set to the number of the stages of image processing in the image processing unit 10, at Step S1202 of FIG. 10B, and it is determined that the image processing on the pixel 7 over the plural stages in the example of FIG. 5B has been completed, the reconfiguration command unit 120 reconfigures, at Step S1203 of FIG. 10B, the reconfigurable circuit into the energy-saving circuit not including the image processing unit 10.

The reconfiguration command unit 120 continues to check the count value of the consecutive hit counting unit 110 even after the reconfiguration into the energy-saving circuit (Step S1204). Then, if the count value changes to 0, the reconfiguration command unit 120 reconfigures the circuit configuration of the reconfigurable circuit of the image processor 100 into the normal circuit (Step S1201). That is, with the change of the count value to 0, the appearance of a pack corresponding to the flag A set to 0, which requires the image processing, is confirmed, and the image processor 100 including the image processing unit 10 (FIG. 9) is formed.

According to the reconfiguration processing illustrated in FIGS. 10A and 10B, the image processing is achieved in the image processing unit 10 of FIG. 9 for the pack requiring the image processing, while the circuit configuration is reconfigured into the circuit not including the image processing unit 10 if the pack not requiring the image processing consecutively appears. Therefore, the power consumption in the image processor 100 is reduced, as compared with a case where the image processing unit 10 is kept operating.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
   a determining unit that determines, in image data formed by a plurality of packs each formed by a plurality of pixels and serving as a unit, a monotonic pack formed by a plurality of pixels equal to a preceding pixel precedently subjected to image processing and a normal pack other than the monotonic pack;
   a pixel row forming unit that forms a pixel row including a plurality of pixels obtained from the normal pack and arranged in a line, while deleting the plurality of pixels included in the monotonic pack;
   a pixel row processing unit that processes the pixel row formed by the pixel row forming unit, by inputting the pixel row to an image processing unit; and
   a supplementing unit that supplements an image processing result of the pixel row output from the image processing unit with, as an image processing result of the deleted pixels of the monotonic pack, a result of image processing by the image processing unit on the preceding pixel obtained from the normal pack, to thereby obtain an image processing result of the image data.

2. The image processing apparatus according to claim 1, wherein the image processing unit is formed in a reconfigurable circuit, and wherein the image processing apparatus further comprises a reconfiguration processing unit that, if the monotonic pack consecutively appears a reference number of times or more in the determination by the determining unit, reconfigures a circuit configuration configured in the reconfigurable circuit into a circuit configuration not including the image processing unit.

3. An image processing method comprising:
   determining, in image data formed by a plurality of packs each formed by a plurality of pixels and serving as a unit, a monotonic pack formed by a plurality of pixels equal to a preceding pixel precedently subjected to image processing and a normal pack other than the monotonic pack;
   forming a pixel row including a plurality of pixels obtained from the normal pack and arranged in a line, while deleting the plurality of pixels included in the monotonic pack;
   processing the formed pixel row; and
   supplementing an output image processing result of the pixel row with, as an image processing result of the deleted pixels of the monotonic pack, an image processing result of the preceding pixel obtained from the normal pack, to thereby obtain an image processing result of the image data.

* * * * *